(12) United States Patent
Liu

(10) Patent No.: US 6,569,977 B1
(45) Date of Patent: May 27, 2003

(54) REAGENTS FOR SWELLING RUBBER AND METHOD OF USING

(76) Inventor: Yangsheng Liu, Nanjing Weilong Industrial Co. Ltd. Jiang su Tong Xin Plaza, No. 198, Ji Qing Road, Nanjing, 210006, Jiangsu Province, P.R. (CN)

( * ) Notice: Subject to any disclaimer, the term of this patent is extended or adjusted under 35 U.S.C. 154(b) by 0 days.

(21) Appl. No.: 09/542,173

(22) Filed: Apr. 4, 2000

(51) Int. Cl.$^7$ .............................................. C08F 136/02
(52) U.S. Cl. ................. 526/335; 526/348.2; 526/348.5; 526/348.6; 526/346; 524/356; 524/401
(58) Field of Search ............................... 526/335, 348.2, 526/348.5, 348.6, 346; 524/356, 401

(56) References Cited

U.S. PATENT DOCUMENTS 4,696,985 A * 9/1987 Martin ....................... 526/119

FOREIGN PATENT DOCUMENTS

| CN | 1127693 | | 7/1996 |
| CN | 1127693 | A * | 7/1996 |

* cited by examiner

*Primary Examiner*—David W. Wu
*Assistant Examiner*—William Cheung

(57) ABSTRACT

Reagents to cause swelling of coarsely ground vulcanized rubber, and a method of using the reagents is disclosed. Reagents which cause rubber to swell but which do not attack or react with rubber include various hydrocarbons, ketones and lactones. Specifically useful are benzene, cyclohexanone, cyclohexane, toluene, xylene, hexane, heptane, acetone, gasoline, paramethadione, ethyl acetate, methyl ethyl ketone and amyl acetate. It is taught that specific reagents work most effectively with specific types of rubbers, and that mixtures of reagents, preferably reagents having the same polarity, may be used. The reagent of the present invention is mixed with the coarsely ground rubber powder for about five minutes or more, causing the rubber particles to approximately double in size. Preferably, the reagent is substantially fully absorbed by the rubber. The swollen rubber is then suitable for further processing, namely, grinding into a superfine powder. The soaking and processing of the rubber is conducted in an enclosed system to that the reagent can be recovered and recycled. A crystalloid salt, such as zinc carbonate may be added to the mixture to assist the grinding process.

30 Claims, No Drawings

REAGENTS FOR SWELLING RUBBER AND METHOD OF USING

FIELD OF THE INVENTION

The present invention relates to reagents for causing rubber to swell in order to facilitate recycling of rubber.

BACKGROUND OF THE INVENTION

It is estimated that 15,000,000 tons or more of vulcanized rubber products are discarded annually. Approximately half this amount is in the form of rubber tires—upwards of 700 million tires are discarded per year worldwide. It is estimated that there are as many as three billion waste tires in the U.S. alone. The handling and disposal of this large volume of rubber products is a significant environmental problem, and the desirability of recycling waste rubber is evident. Unfortunately, the very properties which make vulcanized rubber so useful make it extremely difficult to recycle. Specifically, rubber does not melt, age or decompose and is designed to be used in extreme environmental conditions. Rubber used in tires is highly elastic and tenacious in a temperature range of $-50°-+150°$ C., and is highly resistant to attack by most common chemical substances. While significant research has been devoted to investigating techniques for recycling rubber, to date only a small percentage of waste rubber is recycled.

One avenue of investigation has been directed to forming rubber powders from waste rubber by grinding the rubber. The rubber powders are then added to a raw rubber mix to form new rubber. This technique has important potential cost savings because the rubber powder reduces the energy and processing required to make new rubber. Currently, rubber powder is used in making many rubber products, including tires, hoses, rubber bands, etc. In addition, rubber powders can be added to other products, such as building materials, to improve their properties.

The amount of rubber powder that can be added to a raw rubber mix during rubber production is highly dependant on the size and shape of the rubber particles which comprise the powder. Specifically, it is known that superfine rubber particles (particles having a diameter of about 200 $\mu$m or less) may be added in significantly higher percentages than larger particles. However, traditional grinding techniques produce rubber particles having a diameter in excess of 600 $\mu$m. To date, addition of rubber powder having particles in excess of 600 $\mu$m has not been accepted by producers of rubber products, because rubber made with large particles has poor properties. Rubber powder consisting of particles in the range of 200–400 $\mu$m may be added in an amount of up to 10% without adversely affecting the quality of the rubber produced.

Finer grain rubber particles may be produced by grinding the rubber at extremely low temperatures (for example, using liquid nitrogen) such that the rubber loses its elasticity. However, due to the energy required to cool the rubber to a sufficiently low temperature, it is uneconomically expensive to form rubber powder in this way.

The inventor of the present invention has previously disclosed a technique for grinding rubber which employs a reagent to cause the rubber to swell. The swollen rubber is more rigid and, therefore, more easily ground into fine particles. The prior disclosure teaches soaking coarsely ground rubber in a non-polar reagent for 5–30 seconds, and then performing further grinding of the resulting swollen powder to achieve a rubber powder with particles having a mean diameter as low as 10 $\mu$m. This disclosure further teaches that such a rubber powder can be mixed with raw rubber in excess of 40% without impairing the physical properties of the rubber. The prior disclosure suggests the use of toluene, xylene, carbon tetrachloride, carbon trichloride, acetone, ethyl alcohol or mixtures thereof. Toluene and xylene were thought, at the time of the prior disclosure, to be particularly good. However, at the time of the prior disclosure the inventor had not arrived at an optimal reagent system for use in his invention, nor had he optimized the soaking process, nor had he investigated the optimal reagents to use with various types of vulcanized rubber.

Accordingly, one object of the present invention is to provide an optimized reagent system for soaking rubber particles to cause them to swell.

Another object of the present invention is to provide a method for soaking rubber particles in a reagent to cause them to swell.

Yet another object of the present invention is to provide reagent mixtures for causing rubber to swell which are optimized for different types of vulcanized rubber.

SUMMARY OF THE INVENTION

The foregoing objects of the invention, and others that will be apparent to those skilled in the art, are realized in the present method for causing rubber particles to swell. In its basic aspect, the present invention comprises a method for causing rubber particles to swell, comprising the steps of mixing coarsely ground rubber particles with a swelling reagent comprising an organic solvent, soaking the mixture for at least five minutes, or until the rubber particles have increased in size by at least 100%, and, if necessary, removing any excess swelling reagent from said mixture. At least two parts of the swelling reagent is used for each part of rubber powder. Preferably, the weight ratio of reagent to rubber is between 2.5–3.5 to 1, so that substantially all of the reagent is absorbed by the rubber. Preferably, the swelling reagent comprises a hydrocarbon, a ketone or a lactone, more specifically a member of the group consisting of benzene, cyclohexanone, cyclohexane, toluene, xylene, hexane, heptane, acetone, gasoline, paramethadione, ethyl acetate and amyl acetate. Most preferred are benzene, cyclohexanone or cyclohexane, and may comprise a mixture of reagents, preferably reagents having the same polarity.

For natural rubber, isoprene rubber, butadiene styrene rubber or 3-polybutadiene rubber, benzene is preferred; for chloroprene rubber or acrylonitrile rubber, cyclohexanone is preferred; and for butyl rubber or ethylene propylene rubber cyclohexane is preferred. When processing different types of rubbers, a mixture comprising at least two of these compounds is preferred.

In order to facilitate removal and recovery of the reagent from the mixture after grinding, the method is performed in an enclosed system and the mixture is heated while applying a vacuum to the enclosed system.

DETAILED DESCRIPTION

According to the present invention, a reagent is mixed with coarsely ground rubber particles in order to cause the rubber particles to swell. The swollen rubber particles are substantially less elastic than unswollen rubber and can be ground into a superfine powder which, is suitable for recycling, as by incorporating the superfine powder into new rubber being produced.

The present invention starts with coarsely ground rubber particles, i.e., particles having a mean diameter in the range of about 500 µm to 1,500 µm. Methods of grinding rubber to form rubber particles in this size range are well known in the art and need not be described in detail. For example, a conventional high speed shearing roller crusher may be used. While practical considerations make it desirable to start with particles in the range stated, there is no reason why the starting particles cannot fall outside of this range.

The coarsely ground particles are placed into a soaking vessel which is, preferably, part of an enclosed system which is configured to automate the entire process. As described in greater detail below, the system is enclosed to facilitate reagent recovery.

A swelling reagent is then mixed with the coarsely ground rubber particles in the soaking vessel. The swelling reagents that have been found to be effective are various organic solvents, including hydrocarbons, ketone and lactones. Specifically, benzene, cyclohexanone, cyclohexane, toluene, xylene, hexane, heptane, acetone, gasoline, paramethadione, ethyl acetate, methyl ethyl ketone and amyl acetate have been found to be effective. The reagent that is selected should be a compound which causes the rubber particles to swell, but which does not attack or react chemically with the rubber. Preferably, the reagent used with a particular type of rubber should have the same polarity as the rubber. Particularly preferred reagents are benzene, cyclohexanone, cyclohexane, with benzene being preferred for use with comprise natural rubber, isoprene rubber, butadiene styrene rubber or 3-polybutadiene rubber, cyclohexanone being preferred for use with chloroprene rubber or acrylonitrile rubber, and cyclohexane being preferred with butyl rubber or ethylene propylene rubber. Two or all three of these reagents, or other reagents, may be mixed in order to process rubber mixtures of various types. When mixing reagents it is preferred to use combine reagents of the same polarity. The coarse rubber particles are soaked in the swelling reagent(s) for a sufficiently long time to cause the particles to increase in size by at least 100%. The exact amount of time required to do this will vary according to the size of the particles, the type(s) of rubber, and the nature of the reagents. However, nornmally the particles should be allowed to soak for at least five minutes. The mixture of rubber particles and reagent may be stirred during this time to ensure that all of the rubber particles come in full contact with the reagent. Preferably, at least twice the volume of the reagent is used as rubber, i.e., at least two parts by weight of reagent are used for one part of rubber particles. In the preferred embodiment of the present invention, the quantity of regent that is used is an amount which is small enough to be fully absorbed by the rubber particles without excess while causing the rubber particles to swell in size by 100%. It is preferably that substantially all of the reagent be absorbed so that it is not necessary to filter or otherwise take steps to separate excess reagent from the swollen rubber particles prior to further processing, e.g., grinding. Normally, the amount of solvent will fall in the range of 2.5 to 3.5 times the amount of rubber, by weight.

The selection and handling of the reagents used in connection with the present invention should take in account health and safety considerations. Whenever possible, preference should given to reagents with the least toxicity, lowest flammability and best handling characteristics. Also, whenever possible, a single reagent, rather than a reagent mixture, should be used. Use of a single reagent makes it easier to collect, condense and recycle the reagent. However, multiple reagents, i.e., a reagent mixture, may be used where necessary to reduce toxicity or when special types of rubbers are included in the rubber mix being recycled.

In the preferred embodiment, after the step of soaking the rubber particles has been completed there is substantially no excess reagent, i.e., substantially all of the reagent has been absorbed. In a less preferred embodiment, any unabsorbed reagent is drained or filtered from the mixture and recovered, preferably for recycling. As noted the step of soaking is conducted in an vessel which is part of an enclosed system, so that any vapors emanating from the mixture may be captured for recovery and recycling. As noted the purpose of soaking the rubber particles is to facilitate further processing, i.e., grinding of the swollen particles to create a superfine rubber powder. According to the present invention, further processing of the particles occurs within the enclosed system so as to prevent the escape of reagent vapors, and thereby permit the recovery and recycling of the reagents. After the rubber particles have been processed, i.e., ground to a superfine powder, the processed rubber is heated causing the absorbed reagent to evaporate. Again, heating of the processed rubber is performed within the same enclosed system so that the reagent can be recovered and recycled after it evaporates. A slight vacuum is applied to the system to facilitate the recovery process.

After the reagent is absorbed by the rubber, a material, preferably a crystalloid salt may be added to enhance grinding. Particularly preferred is zinc carbonate because it is compatible with subsequent rubber processing. In one embodiment of the present invention, up to 5% by weight of zinc carbonate is added.

EXAMPLE 1

Coarsely crushed rubber having grains averaging 1.5 mm, consisting of a mixture of 70% natural rubber and 30% 3-polybutadiene rubber, was fed into a soaking vessel containing cyclohexane. The volume of cyclohexane was two times the volume of the rubber. The resulting mixture was stirred at a rate of 25 rotations per minute for five minutes, after which the size of the rubber particles had increased by 100%. The swollen rubber grains were fed to a grinder, and then dried to evaporate and recover the reagent. Substantially all of the resulting rubber powder was able to pass through a mesh screen having opening of 180 µm. Thirty percent (30%) of the powder was fine enough to pass through a screen having openings of 150 µm and twenty percent (20%) of the powder was fine enough to pass through a screen with openings of 125 µm. The resulting powder contained less than 1 part per million (ppm) of the reagent, cyclohexane.

EXAMPLE 2

Coarsely ground rubber grains having an average diameter of 0.9 mm, consisting of a mixture of 45% natural rubber, 20% butyl rubber, 20% ethylene propylene rubber and 15% styrene-butadiene rubber, was fed into a soaking vessel containing a reagent mixture consisting of 80% cyclohexane and 20% methyl ethyl ketone. The volume of the reagent mixture was 2.5 times the volume of the rubber. The mixture was stirred for five minutes after which the size of the rubber particles increased by 100%. After the reagent was absorbed by the rubber, five percent (5%) by weight of zinc carbonate was then added to the swollen rubber particles to improve grinding, and the mixture conveyed to a grinder. Zinc carbonate is used in new rubber production in the vulcanization process and, therefore, need not be removed from the superfine rubber powder of the present invention prior to incorporation in new rubber. The solvent in the ground rubber was removed by drying, and the size of the particles was reduced. Substantially all of the resulting powder passed through a 180 µm mesh screen, 80% of the powder passed through a 150 µm mesh screen, 50% passed through a 125 µm mesh screen, and 20% passed through a 75 µm screen. The reagent recovery was in excess of 99%; the processed superfine rubber powder contained less than 0.04 ppm of cyclohexane and 0.06 ppm of methyl ethyl ketone.

While the present invention has been described in connection with preferred embodiments thereof, those skilled in the art will appreciate that further additions and modifications may be made without departing from the spirit thereof. Therefore, the invention is limited only by the appended claims.

What is claimed is:

1. A method of causing rubber particles to swell, comprising the steps of:
   mixing coarsely ground rubber particles with a swelling reagent comprising an organic solvent and a crystalloid salt;
   soaking said mixture for about five minutes or more;
   grinding said swollen rubber particles;
   removing said swelling reagent from said rubber particles.

2. The method of claim 1, wherein said swelling reagent comprises a hydrocarbon, a ketone or a lactone.

3. The method of claim 2 wherein said swelling reagent comprises at least one reagent from the group consisting of benzene, cyclohexanone, cyclohexane, toluene, xylene, hexane, heptane, acetone, gasoline, paramethadione, ethyl acetate, methyl ethyl ketone and amyl acetate.

4. The method of claim 3 wherein said swelling reagent comprises benzene, cyclohexanone or cyclohexane.

5. The method of claim 1 wherein said swelling reagent comprises a mixture of reagents.

6. The method of claim 1 wherein said rubber particles comprise natural rubber, isoprene rubber, butadiene styrene rubber or 3-polybutadiene rubber and said swelling reagent comprises benzene.

7. The method of claim 1 wherein said rubber particles comprise chloroprene rubber or acrylonitrile rubber and said swelling agent comprises cyclohexanone.

8. The method of claim 1 wherein said rubber particles comprise butyl rubber or ethylene propylene rubber and said swelling reagent comprises cyclohexane.

9. The method of claim 1 wherein about 99% or more of each reagent is removed from the rubber.

10. The method of claim 1 wherein said crystalloid salt is zinc carbonate.

11. The method of claim 1 wherein the amount by weight of solvent used is at least twice the amount of rubber.

12. The method of claim 11 wherein the ratio of solvent to rubber is between 2.5–3.5 to 1, by weight.

13. The method of claim 1 wherein the solvent is substantially fully absorbed by said rubber particles and the rubber particles increase in size by about 100% or more.

14. The method of claim 13 wherein the ratio of solvent to rubber is between 2.5–3.5 to 1, by weight.

15. A reagent system for causing mixed coarsely ground particles of different rubber types to swell, comprising at least two reagents in group consisting of benzene, cyclohexanone and cyclohexane, with a crystalloid salt.

16. The reagent system of claim 15 comprising all three reagents in said group.

17. A method of causing rubber particles to swell, comprising the steps of:
   mixing one part of coarsely ground rubber particles with at least two parts of a swelling reagent comprising a hydrocarbon, lactone or ketone reagent;
   adding a crystalloid salt to the swollen rubber particles; and
   soaking said mixture for a period of time sufficient to allow said rubber particles to increase in size by at least about 100% and substantially all of the reagent is absorbed.

18. A method of causing particles of rubber comprising natural rubber, isoprene rubber, butadiene styrene rubber or 3-polybutadiene rubber to swell, comprising the step of soaking said rubber particles in a swelling reagent comprising benzene and a crystalloid salt.

19. A method of causing particles of rubber comprising chloroprene rubber or acrylonitrile rubber to swell, comprising the step of soaking said particles in cyclohexanone and a crystalloid salt.

20. A method of causing particles of rubber comprising butyl rubber or ethylene propylene rubber to swell, comprising the step of soaking said particles in cyclohexane and a crystalloid salt.

21. The method of claims 18, 19, or 20 wherein said step of soaking is performed for about five minutes or more.

22. The method of claim 17 wherein the ratio of reagent to rubber is in the range of 2.5–3.5 to 1, by weight.

23. The method of claim 17 wherein said coarsely ground rubber particles have a diameter of at least 500 µm.

24. The method of claim 17 further comprising the step of removing said reagent from said rubber particles after the swollen rubber particles have been processed.

25. The method of claim 24 wherein said method is performed in an enclosed system and said step of removing said swelling reagent from said processed rubber comprises heating said rubber particles while applying a vacuum to said enclosed system.

26. The method of claim 25 wherein said mixture is heated to a temperature of about 80° C. or more to remove said swelling reagent.

27. The method of claim 17 wherein said time is about five minutes or more.

28. The method of claim 17 wherein said swelling reagent comprises a mixture of reagents.

29. The method of claim 17 wherein said step of removing the reagent from said mixture comprises the step of recovering at least 99% of the reagent absorbed by the rubber particles.

30. The method of claim 17 wherein said crystalloid salt comprises zinc carbonate.

* * * * *